United States Patent [19]

Wall

[11] 3,926,129
[45] Dec. 16, 1975

[54] EVAPORATIVE CONCENTRATION OF WASTE SLUDGES WITH INCINERATOR EXHAUST GASES

[75] Inventor: Clarence J. Wall, Westport, Conn.

[73] Assignee: Dorr-Oliver Incorporated, Stamford, Conn.

[22] Filed: Jan. 3, 1975

[21] Appl. No.: 538,396

[52] U.S. Cl. ............... 110/7 B; 110/8 F; 110/15; 201/31
[51] Int. Cl.² ........................................... F23G 5/02
[58] Field of Search ............ 110/7 R, 7 B, 7 S, 8 R, 110/8 C, 8 F, 15, 28 F; 122/4 D, 7 C; 201/31; 48/197 R, 209, 210

[56] References Cited
UNITED STATES PATENTS

| | | | |
|---|---|---|---|
| 2,171,535 | 9/1939 | Berg et al. | 110/15 |
| 3,351,030 | 11/1967 | Albertson et al. | 110/8 |
| 3,703,919 | 11/1972 | Owens et al. | 122/7 X |
| 3,733,271 | 5/1973 | Olsen | 110/15 |
| 3,736,111 | 5/1973 | Gardner et al. | 201/31 |
| 3,801,514 | 4/1974 | Joseph | 201/31 |

*Primary Examiner*—Kenneth W. Sprague
*Attorney, Agent, or Firm*—H. M. Snyder; Burtsell J. Kearns; Theodore M. Jablon

[57] ABSTRACT

Waste sludges containing a high proportion of water are concentrated by an evaporative process prior to fluid bed incineration. The evaporation is carried out in a scrubber-evaporator into which air at high temperature is passed, the high temperature achieved by heat exchange with the incinerator exhaust gases. The exhaust gases are also passed through an additional heat exchanger to preheat the fluidizing-combustion air feed to the fluid bed reactor. The exhaust gases are treated in a venturi scrubber before discharge to the atmosphere.

15 Claims, 2 Drawing Figures

EVAPORATIVE CONCENTRATION OF WASTE SLUDGES WITH INCINERATOR EXHAUST GASES

This invention is directed to apparatus and a method for evaporative concentration of waste sludge prior to incineration.

Waste streams emanating from oil refineries and other industrial processes present serious problems for proper non-polluting disposition. Many of these waste streams, although they contain a high proportion of water, are nevertheless combustible and one method of disposition is therefore incineration. Fluid bed reactors have been successfully applied to the incineration of various combustible waste streams including oil refinery waste. In these reactors the bed of inert particles, sand, for example, is supported on a gas distribution or constriction plate. Air is passed through the constriction plate to "fluidize" the inert particles. After raising the sand bed temperature to a suitable level, fuel is injected directly into the bed and ignited to heat the bed to operating temperature and then the combustible waste is introduced. The waste undergoes combustion and the water is vaporized. The combustion of the waste generates a substantial amount of heat which makes it possible to reduce the amount of auxiliary fuel injected and, in some cases, may eliminate the necessity for any auxiliary fuel (autogenous combustion).

The purpose of the incinerator is to completely consume the organic matter in the waste feed stream, leaving as a residue only an inert ash, and to perform this combustion reaction in a manner which does not produce objectionable odors. Odorless combustion is achieved by complete oxidation of the organic matter and requires, as a practical matter, temperatures at least in the range from about 700°C to about 800°C depending on the percent excess air.

Waste sludges from oil refineries and other industrial operations are generally quite dilute and may contain up to as much as 95 percent or even 98 percent water. Dewatering by settling (thickening) or by filtering or centrifuging can be used to some extent, but in many cases, the sludges do not respond effectively to this type of dewatering treatment or respond only to a limited extent. In some cases, the problem may be associated with dissolved which with the sludge may contain; such a situation is encountered in dissolved air flotation. In other cases, the sludge may contain such excessive amounts of abrasive grit material that high wear and consequent frequent maintenance results in any centrifugal dewatering operation.

In order to minimize the capital investment and the operating cost for incineration of these sludges, it is most desirable to dewater the sludges to a point where the sludge water content - BTU content ratio is such that the sludge can be incinerated autogenously, as mentioned above. In most cases this autogenous operation is obtained at a sludge water content of about 80 percent ± 5 percent (combustibles and inerts 20 percent ± 5 percent). Recuperation of heat by use of a gas-to-gas heat exchanger for heating the fluidizing air with heat available in the hot exit gases from the incinerator will increase the incinerator efficiency and increase the amount of sludge water that can be handled for an autogenous operation. Air preheating is generally limited by material of construction considerations for the heat exchanger to preheating the air to about 1000°F which results in cooling the reactor exit gases from 1500°F to about 1000°F. This 1000°F hot gas from the heat exchanger represents a substantial amount of heat which is not being utilized if it is merely discharged to atmosphere at that point.

While the drive to accomplish non-polluting disposition of industrial waste is of undiminished strength, it has become imperative to accomplish this disposition at as low an energy cost as is possible. Accordingly, there is a real need for a process for the incineration of industrial waste streams which will not only effectively dispose of the potentially polluting materials in the waste stream, but will also rely for its energy requirements primarily upon the combustible materials within the waste stream itself.

It is an object of this invention to efficiently utilize in an incineration process, the combustible constituents in an industrial waste stream to satisfy the energy requirements of the incineration process.

It is a further object of this invention, in a fluid bed process for the incineration of industrial waste streams, to efficiently utilize the heat in the exhaust stream from the fluid bed reactor while at the same time providing adequate treatment of all exhaust streams to remove pollutants therefrom.

It is still another object of the invention to efficiently utilize the waste heat in the exhaust stream of a fluid bed reactor without imposing on the fluid bed reactor a recirculating load of inert ash.

Other objects and advantages will become apparent to those skilled in the art from the following description, taken in conjunction with the drawings, in which.

Generally speaking, the present invention is concerned with the incineration of a waste sludge stream and involves the concept of utilizing the waste heat in the exhaust gases of an incinerator to evaporate water from the feed sludge. A gas-to-gas heat exchanger is used to preheat air to a temperature of about 400° to 800°F as the medium for the evaporation process and to cool the reactor exhaust gases from about 1000°F to about 300° to 600°F.

More specifically, the invention calls for a pair of gas-to-gas heat exchangers operating on the exhaust gas stream of the fluid bed incinerator. The first of these heat exchangers operates to heat a stream of air (and to cool the reactor exhaust gases) which is then employed as the fluidizing and combustion gas for the fluid bed reactor. The second of these heat exchangers operates to heat an air stream which is then conducted to a venturi scrubber-evaporator, in which weak feed liquor is fed into the venturi with the hot gas. Evaporation occurs and the underflow from the venturi scrubber-evaporator is a strong liquor having an increased concentration of combustible substances therein which is then fed to the fluid bed reactor. The exhaust gas from the venturi scrubber-evaporator may be discharged to atmosphere. The exhaust gas stream of the fluid bed reactor after traversing the two heat exchangers is directed to a venturi scrubber which traps and separates particulate material in the gas stream which can then be discharged to atmosphere.

In a modified form of the invention, when the waste liquor undergoing treatment contains low boiling compounds which may evaporate and join the exhaust stream from the venturi scrubber-evaporator, the heat exchangers may be operated in series rather than in parallel as in the system described above. The low boiling compounds present in the waste water tend to vaporize, at least in part, together with the water in the venturi scrubber-evaporator and it is undesirable to discharge such a gas stream into the atmosphere. Accordingly, the gas stream from the evaporator is cooled, thereby condensing the low boiling compounds and the major portion of the water vapor therein. If the character of the waste stream is such that even after cooling an undesirable amount of low boiling compounds remain in the exhaust gas from the scrubber-evaporator, then this gas stream can be routed to the first heat exchanger for reheating and subsequent introduction into the fluid bed reactor as the fluidizing and oxidizing gas. The low boiling compounds remaining in the gas stream will thus be destroyed in the fluid bed reactor.

Figure 1:
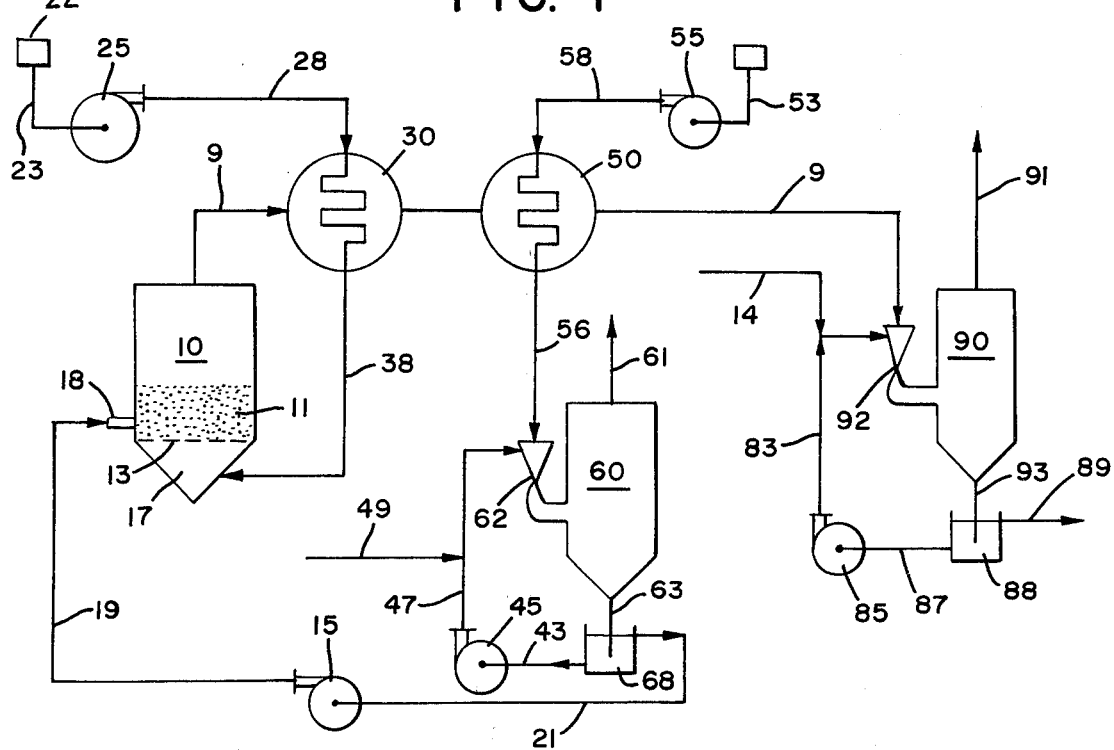
FIG. 1 is a schematic view of one embodiment of the invention.

Turning to the drawings, FIG. 1 shows a fluidized bed reactor 10 in which a particulate bed 11 is supported on a constriction plate 13 which is positioned above a windbox 17. A blower 25 delivers a flow of air from filter intake 22 and conduit 23 through conduit 28 to the heat exchanger 30. The air passes through the heat exchanger 30 to conduit 38 which is connected for delivery of air to the windbox 17. The exhaust conduit 9 from reactor 10 is connected to the first heat exchanger 30 and from there to a second heat exchanger 50 from which the exhaust gases are conducted to the venturi scrubber 90. These somewhat cooled exhaust gases are introduced into the venturi 92 with water delivered through conduit 14 and recycled fluid through conduit 83. Particulate matter in the exhaust gases is removed from the gas in the scrubber section and the solids-containing water exits through conduit 93 to receiving vessel 88 from which a portion of this water is recycled through conduit 87 and pump 85, with another portion withdrawn and separately disposed of through conduit 89. The venturi scrubber 90 is provided with a stack 91.

The blower 55 is connected to conduit 58 which, in turn, is connected to the heat exchanger 50. Conduit 56 is positioned between the heat exchanger 50 and the venturi scrubber-evaporator 60. The venturi scrubber-evaporator 60 has a venturi throat 62 into which weak feed liquor is delivered from conduit 49 by way of conduit 47. Venturi scrubber-evaporator 60 is provided with an exhaust gas conduit 61 and a concentrate conduit 63 at the base of the venturi scrubber 60. Concentrate conduit 63 is connected to receiving vessel 68 and the latter is connected to the pump 15 by the conduit 21. Conduit 19 connects the outlet of pump 15 to the reactor vessel feed injector 18. A recirculating circuit is provided including a pump 45 connected to the vessel 68 by the conduit 43 and also connected to the venturi member 62 by the conduit 47.

In operation, the fluid bed reactor incinerator receives a preheated stream of air from the first heat exchanger 30 through the conduit 38. This heated air stream fluidizes the sand bed 11 into which combustible feed is injected through the feed injector 18. The feed thus introduced is consumed by combustion and maintains the fluidized bed at the desired reaction temperature. The hot exhaust gas stream from the reactor is conducted through the two heat exchanger elements 30 and 50 by conduit 9. After leaving the heat exchangers the exhaust gas stream is substantially cooler than its original temperature and it is then introduced into the venturi scrubber 90 which is essentially conventional in operation and removes particulate solids from the gas stream before discharging the gas to the atmosphere through conduit 91. The weak feed liquor is introduced through conduit 49 into the venturi scrubber-evaporator 60. The second air stream generated by the blower 55 travels through the conduit 58 to the heat exchanger 50 and then into the venturi scrubber-evaporator through conduit 56. The weak feed liquor and the heated air come into contact in the venturi section 62 and the evaporation of the water commences immediately and continues into the separator section of the venturi scrubber-evaporator 60. The water vapor generated in the scrubber-evaporator exits with the air through conduit 61 and, as shown, is discharged into the atmosphere through conduit 61. The concentrated feed liquor which accumulates in the bottom of the venturi scrubber-evaporator 60 flows through conduit 63 into the vessel 68 and from there it is pumped by pump 15 along the conduits 21 and 19 to the feed injector 18. There is provision made for recycle of a portion of the concentrated feed liquor by means of the pump 45 and the conduits 43 and 47.

The second gas-to-gas heat exchanger 50 may be operated in concurrent flow to minimize corrosion problems in the heat exchanger. This heat exchanger preheats the incoming air to a temperature of 400° to 500°F and simultaneously cools the reactor exit gases from about 1000°F to about 500° to 600°F. If the sludge feed and the auxiliary fuel do not contain chlorides or sulphur or other materials that would cause corrosion in the second heat exchanger, then countercurrent gas flow can be used in the heat exchanger and the air preheated to as high as 800°F with the reactor exit gases consequently cooled from about 1000°F to about 300° to 400°F. Thus, a more concentrated waste liquor is provided by introducing the dilute waste sludge into the venturi scrubber-evaporator where some of the water is removed by evaporation. With air at 500°F at admission to the venturi scrubber and for atmospheric air obtained at 90 percent relative humidity and 100°F, the adiabatic saturation temperature would be about 134°F. This means that water would in effect be evaporated from the waste liquor at a temperature of 134°F. Likewise for atmospheric air of 90 percent relative humidity at 100°F heated to 800°F and entering the venturi scrubber-evaporator at 800°F, the adiabatic saturation temperature would be about 148°F. In this case, water evaporation from the waste liquor would in effect be taking place at 148°F.

The use of a separate heat exchanger using air extracting heat from the incinerator exhaust gases and using this hot air for evaporating water from the weak waste liquor instead of using the incinerator exhaust gases directly in a scrubber-evaporator has two distinct advantages. By using atmospheric air as the heat carrier instead of the incinerator exhaust gases, the adiabatic saturation temperature is much lower for atmospheric air than for the incinerator exhaust gases because of the high water vapor content of the incinerator exhaust gases compared to atmospheric air.

For this reason, water evaporation from the weak liquor occurs in effect at a lower temperature and therefore there would be less evaporation of any low boiling compounds in the waste liquor with attendant odor or other problems with the scrubber-evaporator exit gases. The other advantage of the separate heat exchanger is that there is no problem of capture and recirculation of inert ash which makes the direct use of incinerator exhaust gases impossible if the waste liquor contains any appreciable amount of inert solids.

In the direct application of exhaust gases, it would not be expected that these fine solids would be retained in the fluidized bed but instead would reappear in the exhaust gases. Further, due to the fine size of the particles, it would not be expected that a cyclone dust collector would be very effective in removing the solids. Any inert solids in the waste liquor, or inert solids (ash) generated by incineration of the waste liquor, would be collected in the scrubber-evaporator and recycled back to the incinerator to build up an intolerable circulating load unless these fine inert solids are removed from the system.

As mentioned before, with some waste liquors the evaporative concentration results in the evaporation of low boiling compounds which render the gas exhaust from the scrubber-evaporator unsuitable for direct discharge into the atmosphere. These low boiling compounds are associated with odors which may be unacceptable. To overcome this problem, it is possible to use two or three stages of tray coolers to cool the gases from the scrubber-evaporator and thereby condense some or all of the low boiling compounds prior to venting the air to atmosphere. The cooling water from this multi-stage tray cooler could be returned to the head end of the waste water treatment plant for treatment due to the condensed low boiling compounds collected by this cooling water.

Figure 2:
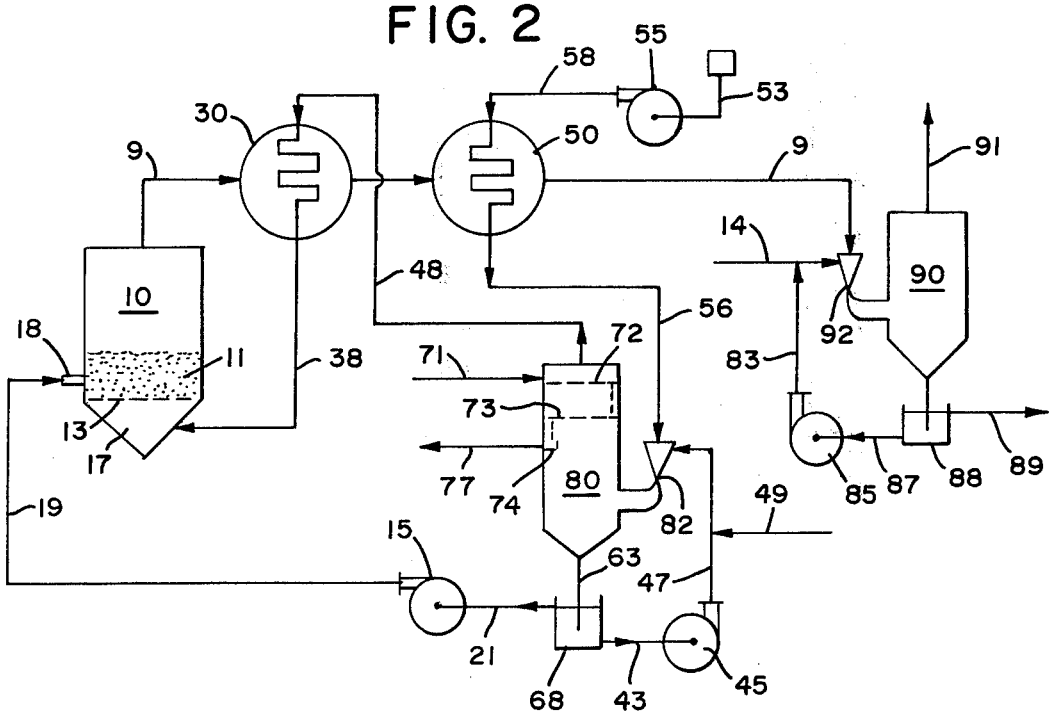
FIG. 2 is a schematic view of a second embodiment of the invention.

In other cases, multi-stage cooling to a temperature of 90° to 120°F is not sufficient to allow venting of the air to atmosphere because all of the low boiling constituents are not condensed at this temperature. Such air could better be returned to the fluid bed incinerator as part or all of the fluidizing and combustion air and a system to carry out this kind of process is set forth in FIG. 2. It will be seen in FIG. 2 that elements similar to those in FIG. 1 bear the same reference characters and that the principle change lies in the air supply arrangement for the system. Thus, in this case, the blower 55 supplies to the heat exchanger 50, through conduit 58, a stream of air which issues from the heat exchanger at an elevated temperature. Conduit 56 directs this heated stream of air into the scrubber-evaporator-cooler 80. In the venturi member 82, the hot gases meet a weak feed liquor stream introduced through conduits 49 and 47. In the main body of the scrubber-evaporator-cooler 80 the concentrated liquor follows entirely the same path as in the system shown in FIG. 1; however, the gases and vapor, including low boiling compounds, are bubbled through the cooling water in the trays 72 and 73 and the temperatures of the gases are drastically lowered. The low boiling compounds and most of the water vapor are condensed and carried away in the cooling water which issues from the scrubber-evaporator-cooler 80 through conduit 79. The exhaust gas from the scrubber-evaporator-cooler 80 exits through conduit 48 still containing some proportion of low boiling compounds which may not be discharged into the atmosphere. This gas stream is introduced into the heat exchanger 30 where reheating occurs. From the heat exchanger the hot gas is directed to the windbox 17 of fluid bed reactor 10 through conduit 38. Destruction of the low boiling compounds in the hot gas is completed in the fluid bed reactor.

While the systems have been described as operating on industrial waste streams, it should be understood that the system is also operable when a stream of biological sludge having the character of dewatered sewage sludge is mixed with such industrial waste streams. It should also be understood that while the system will preferably operate autogenously, that an auxiliary fuel injection system (not illustrated) is provided for use during the startup period and also to introduce additional fuel during periods when the heating values of the sludges fed to the system are not sufficient to maintain autogenous combustion.

For the purpose of giving those skilled in the art a better understanding of the invention, the following example is offered:

EXAMPLE

An incineration system operates on two waste streams. Stream A is a refinery waste stream carrying 33.3 pounds per minute of total solids plus oil with 50 percent inert solids. Stream A has a heating value of 10,800 BTU/pound. Stream B is an undigested biological sludge carrying 7.7 pounds per minute of total solids having a heating value of 8,000 BTU/pound with 30 percent inert solids. Stream A can be dewatered by conventional mechanical means to 15 percent solids and Stream B to 12 percent solids, as indicated in Table I below, to give a mixed stream of 14.3 percent solids. Column II of Table I below shows the effect of concentration of Stream A to 23.8 percent solids in a venturi scrubber-evaporator using hot air from a second heat exchanger in accordance with the present invention. The mixed stream as indicated in this Table contains 20 percent solids.

TABLE I

| Waste Stream | I<br>% Solids as received | II<br>% Solids after concentration of Stream A |
|---|---|---|
| Stream A - Oil Sludge Waste | 15 | 23.8 |
| Stream B - Undigested Biological Sludge | 12 | 12 |
| Mixed Stream A and B | 14.3 | 20 |

Table II below shows the results obtained upon incineration of the conventionally dewatered waste streams and the stream which has been dewatered in accordance with the present invention. In both cases, fluid bed reactors are operated with 50 percent excess air and a freeboard temperature of 1600°F is maintained yielding exhaust gas to the first heat exchanger at a temperature of 1500°F.

TABLE II

| HOT WINDBOX REACTOR SYSTEM | I | II |
|---|---|---|
| Fluidizing Air Flow - SCFM (Standard Cubic Feet/Min.) | 10,720 | 7,440 |
| Blower HP | 430 | 300 |
| Auxiliary Fuel Required - GPM No. 2 Oil | 2.14 | 0.53 |
| -BTU/Hr. | $17.1 \times 10^6$ | $4.3 \times 10^6$ |
| Total Heat Input - BTU/Hr. | $51 \times 10^6$ | $35 \times 10^6$ |
| Water Evaporated in Incinerator - No./Hr. | 14,740 | 9,840 |
| FS Reactor Size: Freeboard dia. - Bed dia. | 23' - 17' | 19' - 14' |
| Total Wet Exit Gases from the fluid bed reactor - ACFM (Actual Cubic Feet/Min.) | 59,630 | 40,940 |

A comparison of columns I and II of the above Table shows the savings of horsepower (130 horsepower) for the fluidizing air blower and the savings in auxiliary fuel (12.8 × 10$^6$ BTU/Hr.) and the reduced reactor size (i.e., 23' diameter freeboard is reduced to 19', and 17' diameter bed is reduced to 14'). These operating and capital economies are attributable to increasing the feed solids concentration from 14.3 percent solids to 20 percent solids. In this example, the scrubber-evaporator is required to evaporate 4,900 pounds of water per hour from Stream A. If air at a temperature of 500°F is employed to carry out the evaporation, an air volume of about 12,000 cubic feet per minute at standard conditions would be required. If air at 800°F is employed then only 6,800 SCFM of air would be required. Employing the system of FIG. 2, with the fluidizing air of 7,440 SCFM preheated to about 700°F the stream of air is first directed to the second heat exchanger and venturi scrubber-evaporator-cooler and cooled in this unit to about 90°F and then is directed to the first heat exchanger to be preheated to 1000°F for use as the fluidizing air for the incinerator. This system eliminates one air blower and avoids any possible odor problem.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A fluid bed incineration system for combustible waste streams having a high proportion of water therein wherein the waste feed liquor is subjected to evaporative concentration using the waste heat of said fluid bed incinerator comprising,
   a fluid bed reactor having a constriction plate for supporting a fluidized bed of particulate material thereabove and defining a windbox therebelow,
   heat exchangers arranged to receive the exhaust gases of said fluid bed incinerator,
   means for conducting the exhaust gas stream from said fluid bed reactor through said heat exchangers and thence to a venturi scrubber,
   blower means for providing air in volume to said heat exchangers,
   conduit means for conducting preheated air from a first of said heat exchangers to said windbox as the fluidizing air for said fluid bed incinerator,
   an evaporator connected to said second of said heat exchangers by a conduit whereby a heated air flow is provided to said evaporator,
   means for introducing a weak feed liquor into said evaporator for exposure to said heated air flow to drive off water from said weak liquor and thereby provide a concentrated feed liquor,
   means for conducting said concentrated feed liquor from said evaporator to said fluid bed reactor for direct injection into the fluidized bed thereof.

2. The incineration system of claim 1 wherein a first blower is provided for said first heat exchanger to provide an air flow thereto and a second blower is provided for said second heat exchanger to provide an air flow thereto.

3. The incineration system of claim 2 wherein an exhaust stack is provided on said evaporator to accommodate the exhaust stream of said evaporator composed of gases and vapor, for discharge into the atmosphere.

4. The incineration system of claim 3 wherein a recirculation circuit is provided for routing a portion of said concentrated feed liquor back to said evaporator.

5. The incineration system of claim 3 wherein gas cooling means and condensate collection means are provided for cooling the gas stream from said evaporator and handling the resultant condensate.

6. The incineration system of claim 1 wherein a single blower provides the air flow to said first and second heat exchangers.

7. The incineration system of claim 6 wherein said blower is directly connected by conduit means to said second heat exchanger and wherein the exit gas conduit of said evaporator is connected to said first heat exchanger for reheating of evaporator exit gases.

8. The incineration system of claim 7 wherein gas cooling means and condensate collection means are provided for cooling said exit gas stream and handling the resultant condensate.

9. The incineration system of claim 8 wherein a recirculation circuit is provided for returning a portion of said concentrated feed liquor to said evaporator.

10. A method for fluid bed incineration of combustible waste liquors in which weak feed liquors are subjected to evaporative concentration using waste heat from the exhaust gases of said fluid bed incinerator, comprising the steps of,
    passing the exhaust gas of said fluid bed reactor through heat exchangers,
    heating air by passing air in volume through said heat exchangers,
    fluidizing the fluid bed in said reactor with said heated air,
    evaporating water from said weak feed liquor with said heated air to provide a strong feed liquor,
    injecting said strong feed liquor into said fluid bed reactor for destruction by combustion.

11. The method of claim 10 wherein two heat exchangers are employed and separate air streams are directed into each heat exchanger for heating and these heated air streams are separately employed, the one to fluidize said fluid bed and the other to evaporate water from said weak feed liquor.

12. The method of claim 11 wherein the gas and vapor from the evaporation step is exhausted to the atmosphere.

13. The method of claim 12 wherein the gas and vapor are cooled to condense water vapor and low boiling compounds before the gas and vapor stream is exhausted to the atmosphere.

14. The method of claim 10 wherein two heat exchangers are employed, serially arranged with a venturi evaporator therebetween, and a single air stream is passed through the heat exchangers and evaporator to the fluid bed reactor for fluidizing the fluidized bed therein.

15. The method of claim 14 wherein the hot gas and vapor stream produced in the evaporator is cooled to condense low-boiling compounds and water vapor, removing the condensed constituents, reheating the remaining gas and vapor stream in one of said heat exchangers and introducing the reheated gas and vapor stream into the fluized bed reactor as the fluidizing medium therefor.

* * * * *